United States Patent [19]

Deguevara

[11] Patent Number: 4,676,414
[45] Date of Patent: Jun. 30, 1987

[54] ARTICLE CARRIER

[76] Inventor: Orlando Deguevara, 211 W. Garfield, Glendale, Calif. 91204

[21] Appl. No.: 832,441

[22] Filed: Feb. 24, 1986

[51] Int. Cl.⁴ .............................................. B60R 9/00
[52] U.S. Cl. ...................... 224/42.03 R; 224/42.03 B; 224/917
[58] Field of Search .................. 224/42.03 B, 42.03 R, 224/42.03 A, 42.07, 315, 42.43, 42.44, 917; 211/70.5

[56]         References Cited
        U.S. PATENT DOCUMENTS

| | | | |
|---|---|---|---|
| 2,220,292 | 11/1940 | Schmidt | 224/42.03 R |
| 2,803,349 | 8/1957 | Talbot | 224/42.03 B X |
| 3,794,227 | 2/1974 | Stearns | 224/42.01 |
| 3,853,255 | 12/1974 | Spencer | 224/42.03 |
| 3,877,622 | 4/1975 | McLain | 224/42.03 |
| 4,046,273 | 9/1977 | Hughes | 214/450 |
| 4,296,879 | 10/1981 | Jordening | 224/42.45 |
| 4,299,341 | 11/1981 | Copeland et al. | 224/42.03 |
| 4,411,461 | 10/1983 | Rosenberg | 293/108 |
| 4,437,599 | 3/1984 | Jordening | 224/319 |
| 4,461,410 | 7/1984 | Tartaglia | 224/42.03 B |

FOREIGN PATENT DOCUMENTS 1027527  3/1978  Canada ......................... 224/42.03 B Primary Examiner—Stephen Marcus
Assistant Examiner—David Voorhees
Attorney, Agent, or Firm—James E. Brunton

[57]            ABSTRACT

An article carrier adapted to be detachably interconnected with a standard, square tube trailer hitch affixed to the frame of a vehicle. The article carrier includes a connector member adapted to be telescopically received within the trailer hitch; a carrier assembly carried by the connector member, including a generally vertically extending column and one or more outwardly extending article supporting elements; and a securement mechanism carried by the carrier assembly for cooperation with the article supporting elements to secure the carried article within the carrier assemblage. First and second locking mechanisms are provided for locking the article carrier to the trailer hitch and for maintaining the securement mechanism in position relative to the article supporting element to prevent unauthorized removal of the article being carried.

13 Claims, 8 Drawing Figures

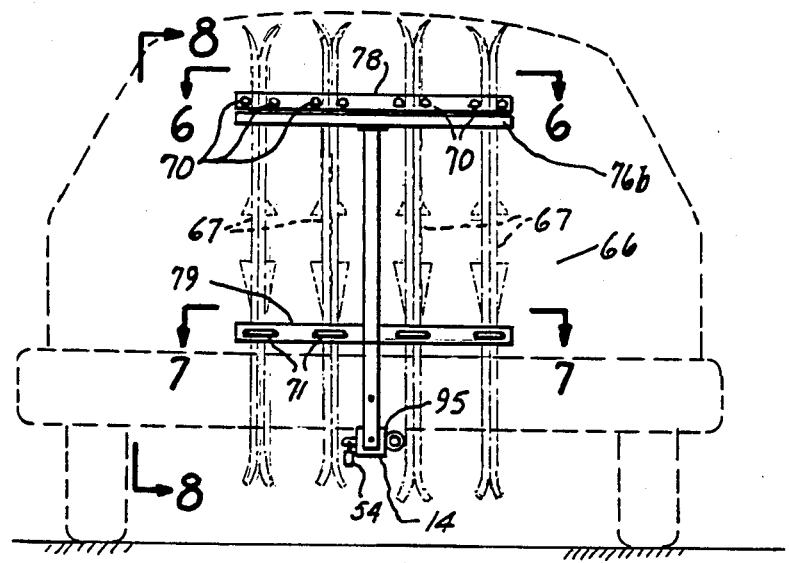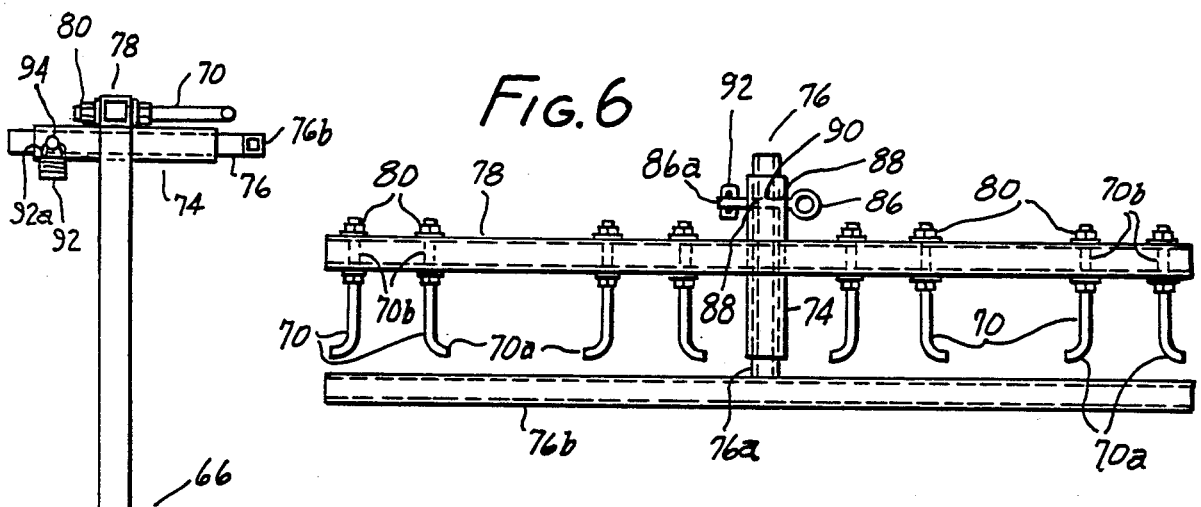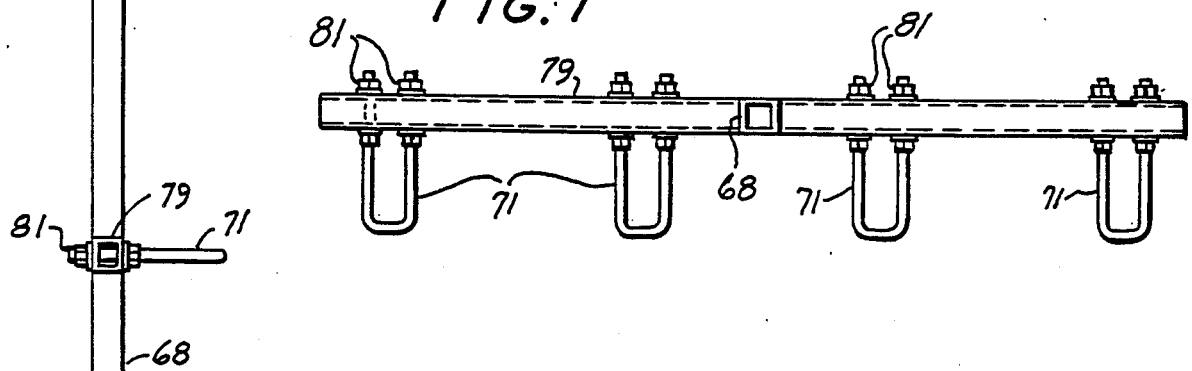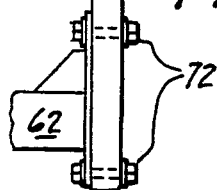

ARTICLE CARRIER

BACKGROUND OF THE INVENTION

1. Field of the Invention

The present invention relates generally to article carriers adapted to be detachable interconnected to passenger vehicles to carry various articles such as bicycles, wheelchairs, skis and the like. More particularly, the invention concerns an article carrier which is adapted to be detachably interconnected with a standard square tube trailer hitch of the type frequently affixed to the frame of an automobile or truck. The article carrier of the invention is uniquely designed to prevent unauthorized removal of the article carrier from the trailer hitch as well as to prevent unauthorized removal of the article being carried from the carrier assembly.

2. Discussion of the Prior Art

In the past, various devices have been suggested for carrying articles such as bicycles, wheelchairs, skis and the like at either the front or the rear of passenger vehicles. Generally these prior art devices are detachably connected to the front or rear bumper of th vehicle by some type of clamping subassembly. Typically the clamping subassembly embodies mechanical fasteners, such as nuts, bolts, washers and the like and various hand tools ar required to connect and disconnect the device. Such devices are often cumbersome and inconvenient to use because they require that proper tools be carried in the vehicle at all times to accomplish the interconnection of the carrier structure with the vehicle bumper. Additionally, such devices are usually easily removable by persons intending to steal either the carrier assembly itself or the carrier assembly along with the bicycle, or other article, being carried thereby.

Prior art article carriers such as bicycle carriers also exhibit other drawbacks. For example they tend to be unstable and fragile and often require straps or other support members which lead forward from the top member of the rack to engage something on the vehicle framework, such as the forward edge of a trunk cover or the like. Such devices are often difficult to mount and frequently are limited to use with vehicles of certain structural characteristics. Additionally such devices tend to work loose with normal road vibrations thereby constituting a serious safety hazard.

Exemplary of prior art bicycle carriers which are removably interconnected with the bumpers of automobiles or trucks are those devices illustrated and described in U.S. Pat. No. 3,877,622 issued to McLain and U.S. Pat. No. 4,299,341 issued to Copelind et al. The patent to Jordening, U.S. Pat. No. 4,437,599 discloses a prior art device for carrying bicycles or wheelchairs. However, the thrust of the later identified patent is directed toward adaptation of an existing bicycle carrier to facilitate the carrying of a wheelchair.

U.S. Pat. No. 3,853,255 issued to Spencer discloses a motorcycle carrier apparatus embodying a very heavy and dissimilarly constructed main support member which can be attached and detached to a standard trailer hitch. The Spencer patent, however, neither discloses nor suggests any type of anti-theft features such as those forming a part of the apparatus of the present invention.

The article carrier of the present invention overcomes the drawbacks of prior art carrier devices by providing an apparatus which is rugged yet lightweight, which is highly stable and which can be easily interconnected with a standard trailer hitch without the use of tools. The apparatus is also quite versatile and various articles such as bicycles, wheelchairs and other velocipedes can be securely mounted thereon for safe transport. Additionally, the apparatus embodies novel securement and locking means to prevent unauthorized removal of the article being carried from the article carrier as well as for preventing unauthorized removal of the article carrier itself from the vehicle trailer hitch.

SUMMARY OF THE INVENTION

BRIEF DESCRIPTION OF THE DRAWINGS

FIG. 5 is a front view of an alternate form of article carrier of the present invention showing the device in position at the rear of an automobile and carrying a plurality of skis (phantom lines).

FIG. 6 is a top view of the alternate form of the invention taken along lines 6—6 of FIG. 5.

FIG. 7 is a view taken along lines 7—7 of FIG. 5.

FIG. 8 is a fragmentary side elevational view taken along lines 8—8 of FIG. 5.

Figure 1:
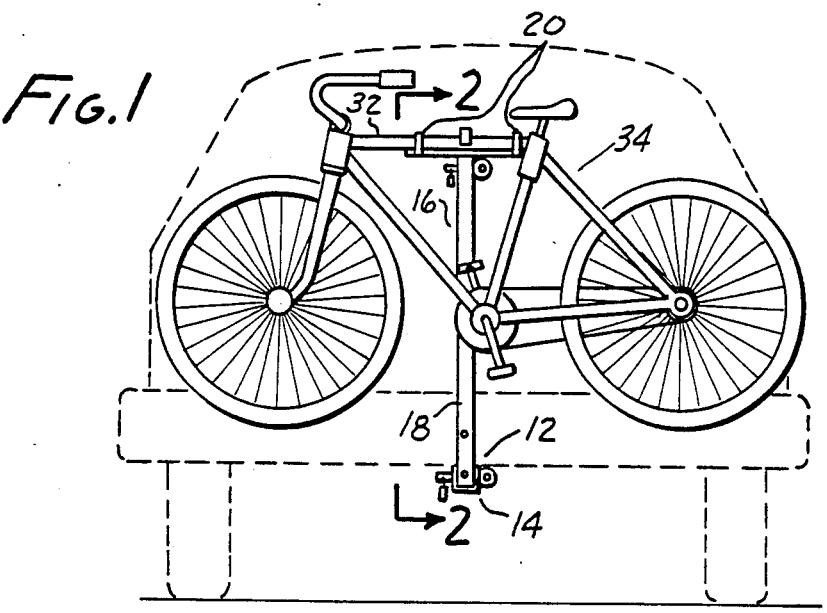
FIG. 1 is a generally schematic view of the article carrier of the present invention showing the device in position at the rear of an automobile and carrying a conventional bicycle.

It is an object of the present invention to provide an article carrier assembly, or rack, which can be readily attached to a standard square tube trailer hitch of the character frequently provided on vehicles such as automobiles and trucks.

It is another object of the invention to provide an article carrier of the aforementioned character which can be securely locked to the trailer hitch so as to prevent unauthorized removal of the carrier rack from the vehicle.

Another object of the invention is to provide an article carrier of the character described which does not interfere with the opening of the trunk cover or lid when the article carrier is attached to the vehicle.

Still another object of the invention is to provide a carrier rack of the class described which is lightweight and durable and can be affixed to the vehicle without the need for any type of hand tools.

Another object of the invention is to provide an article carrier as described in the preceding paragraphs in which the article to be carried can be firmly and safely supported on the carrier assembly and can be secured in place by a novel anti-theft securement member which can be locked in engagement with the article being carried so as to positively prevent unauthorized removal of the article from the carrier.

Another object of the invention is to provide a carrier rack which is readily attachable to an automobile or truck for the transport of objects, devices and articles other than bicycles including articles such as wheelchairs, motorscooters, skis and the like.

Still another object of the invention is to provide a carrier of the class described which is safe to use even under conditions of high vibration tending to loosen the carrier connection to the vehicle or to loosen the securement mechanism which secures the article to the article carrier.

Yet another object of the invention is to provide an article carrier as described in the foregoing paragraphs which is constructed of a minimum number of component parts, is extremely durable and easy to use while at the same time being attractive and streamlined in appearance.

The foregoing, along with other objects of the invention are achieved by an article carrier adapted to be detachably interconnected with a standard, square tube trailer hitch affixed to the frame of a vehicle, which article carrier comprises a connector member adapted to be telescopically received within the trailer hitch; a carrier assembly carried by the connector member, including a generally vertically extending column and one or more outwardly extending article supporting elements; and a securement mechanism carried by the carrier assembly for cooperation with the article supporting elements to secure the carried article within the carrier assemblage. Also forming an important feature of the article carrier of the invention is first and second locking mechanisms for locking the article carrier to the trailer hitch and for maintaining the securement mechanism in position relative to the article supporting element to prevent removal of the article from the carrier assemblage.

Description of a First Embodiment of the Invention

Referring to the drawings, and particularly to FIGS. 1 through 4, one form of the article carrier of the present invention is there illustrated. This form of the invention comprises a lower connecting member 12 (FIG. 3) adapted to be removably interconnected with a tubular trailer hitch 14 of the character frequently mounted at the rear of automobiles, pick-up trucks and the like. Interconnected with the connecting member 12 is a carrier assemblage generally designated in FIG. 2 by the numeral 16 for carrying an article such as a bicycle, wheelchair, or other velocipede in a secure manner at the rear of the vehicle.

Figure 2:
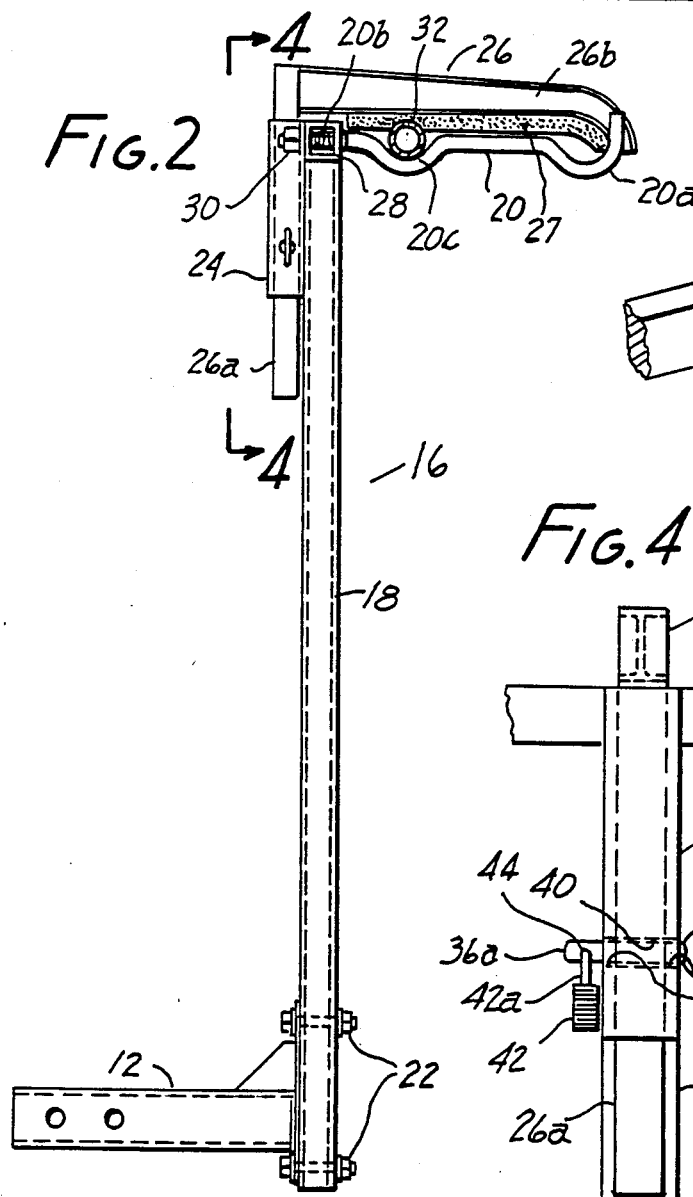
FIG. 2 is a side elevational view of the article carrier of the invention taken along lines 2—2 of FIG. 1.
Figure 3:
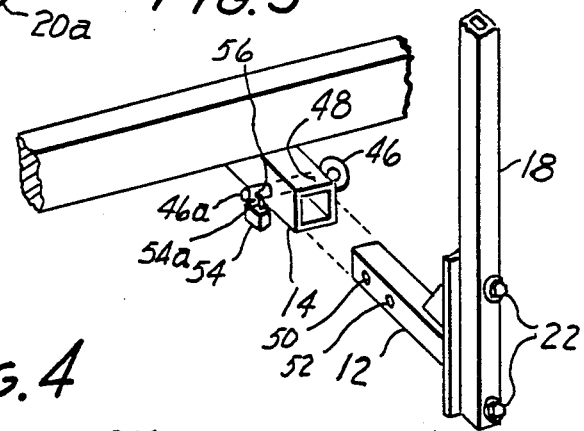
FIG. 3 is a fragmentary exploded view illustrating the manner in which the article carrier is telescopically received within a standard automobile mounted trailer hitch.

In the embodiment of the invention shown in FIGS. 1 through 4, the carrier assemblage 16 comprises a generally vertically extending column 18 and a pair of outwardly extending article supporting first elements 20 for removably supporting the article to be carried. As best seen in FIGS. 2 and 3, column 18 is interconnected with connecting member 12 by means of upper and lower threaded fasteners 22.

Forming an important part of the present invention is securement means carried by the carrier assemblage for cooperation with the article supporting elements 20 for preventing unauthorized removal of the carried article from the carrier assemblage. This securement means here comprises first and second slidably interconnected members 24 and 26 (FIG. 2). In the form of the invention shown in FIG. 2, first member 24 of the securement means is connected to, and extends generally parallel with respect to, vertically extending column 18. Member 24 can be connected to column 18 by any suitable means such as welding. Second member 26 is generally "L" shaped, having a vertically extending member 26a which is telescopically receivable within tubular member 24 and a second outwardly extending member 26b which carries, along its lower surface, a padding material 27, such as sponge rubber or the like. In a manner presently to be described, portion 26b of second member 26 is adapted to be moved into close proximity with the article being carried to prevent unauthorized removal thereof from the article carrier.

Figure 4:
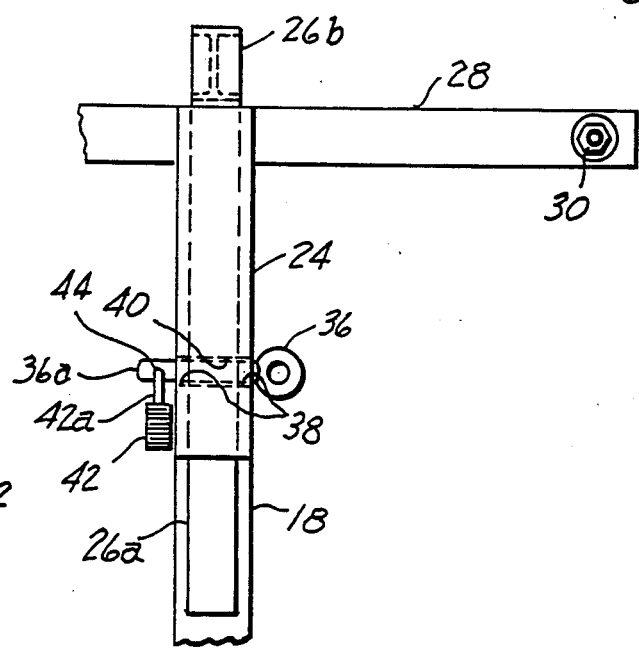
FIG. 4 is an enlarged fragmentary view taken along lines 4—4 of FIG. 2.

Referring now particularly to FIGS. 2 and 4 of the drawings, the carrier assemblage can be seen to further comprise a generally horizontally extending member 28 connected as by welding to column 18 proximate the upper end thereof. Horizontally extending member 28 functions to carry the pair of spaced apart article supporting elements 20 in the manner illustrated in FIG. 1. Each of these members 20 is provided with a hook-like portion 20a formed proximate the outer end thereof and includes a threaded shank portion 20b formed proximate the other extremity thereof. Threaded shank portions 20b extend through apertures provided in horizontal member 28 and are secured in place by means of threaded nuts 30. Provided intermediate the ends of the article supporting first elements 20 are concave indentures 20c adapted to receive a frame member, such as a cross bar, 32 of a bicycle 34 which in the form of the invention illustrated in FIGS. 1 and 2 comprises the carried article. It is to be understood that the article supporting first element could also be used to removably support frame members of other velocipedes such as wheelchairs, motorscooters or the like.

Forming another important feature of the present invention is a first locking means for maintaining the securement means in close proximity with the article supporting elements to prevent unauthorized removal of the article from the carrier assemblage. In the present embodiment of the invention, this first locking means comprises an elongated locking pin 36 (FIG. 4) which is telescopically receivable within indexable apertures 38 and 40 formed in first member 24 and second member 26a respectively. Also forming a part of the first locking means of the present invention is a padlock 42 having a shackle 42a which is closely receivable within an aperture 44 formed proximate extremity 36a of locking pin 36. With this construction, when member 26a is telescopically positioned within member 24 so that member 26b is in pressural engagement with the frame member 20c of the bicycle in the manner shown in FIG. 2, apertures 38 and 40 will move into index so as to permit the insertion of locking pin 36. With the locking pin fully inserted into apertures 38 and 40, padlock 42 can be secured in place as shown in FIG. 4 thereby preventing removal of pin 36 from apertures 38 and 40. This inability to remove pin 36 will, of course, prevent upward movement of member 26 relative to member 24 and, in turn, will preclude the unauthorized removal of frame member 20c of the bicycle from the article carrier. Only after padlock 42 is unlocked by the keyholder and removed from pin 36 can the pin be removed from members 24 and 26 to permit member 26 to be telescopically raised a sufficient distance so that frame member 32 of the bicycle can be removed from between members 20 and 26.

Turning now to FIG. 3, the second locking means of the present invention is there illustrated. This second locking means prevents disconnection of the connecting member 12 from the trailer hitch assembly 14 and comprises an elongated locking pin 46 which is telescopically receivable within apertures 48 formed in the side walls of tubular trailer hitch member 14, which apertures are indexable with either of two longitudinally spaced apart apertures 50 and 52 formed in connector member 12 of the article carrier of the present invention. Also forming a part of the second locking means of the invention is a second padlock 54 having a shackle 54a which is closely receivable within an aperture 56 formed proximate extremity 46a of locking pin 46. With this construction, when member 12 is telescopically positioned within hollow trailer hitch member 14 so that either apertures 50 or 52 are indexed with apertures 48 in the trailer hitch member, locking pin 46 can be inserted in the manner shown in FIG. 3 with extremity 46a protruding from one side of the trailer hitch member. In this position, shackle 54a of padlock 54 can be inserted into aperture 56 thereby preventing removal of locking pin 46 from the assemblage. This inability to remove pin 46 will, of course, prevent withdrawal of member 12 with respect to the trailer hitch, which in turn will prevent unauthorized removal of the article carrier from the trailer hitch which has been fixedly secured to the vehicle. Only after padlock 54 is unlocked by the keyholder and removed from pin 46 can the pin be removed from members 12 and 14 to permit disattachment of the article carrier of the invention from the trailer hitch of the vehicle.

OPERATION OF THE FIRST EMBODIMENT OF THE INVENTION

When the article carrier of the present invention is used to carry a bicycle, a wheelchair or similar velocipede, the form of the invention illustrated in FIGS. 1 through 4 is selected for use. In mounting this apparatus to the vehicle, padlock 54 is removed from pin 46 and the pin is removed from member 12 of the article carrier. Member 12 is then telescopically inserted into the trailer hitch so that either apertures 50 or apertures 52 align with apertures 48 of the trailer hitch. Which set of apertures is to be selected, of course, depends on the velocipede being carried and the clearance required between the article carrier and the vehicle. Once the selected apertures in member 12 are aligned with the apertures in the trailer hitch, pin 46 can be inserted and padlock 54 secured in place.

With the carrier apparatus secured to the trailer hitch in the manner described, padlock 42 is removed from pin 36 and pin 36 is removed from the upper assemblage of the carrier. Member 26 is then telescopically removed from member 24 and the cross-bar of the bicycle, or the frame member of a different velocipede, is positioned so as to rest in the concave indentation 20c formed in elements 20. With the article to be carried so positioned, member 26 is once again mated with the carrier assemblage by telescopically inserting portion 26a into member 24. Member 26b is urged downwardly to compress the padding 27 against the frame member 32 and to index apertures 38 and 40 so that pin 36 can be reinserted. When the pin is fully inserted in the manner shown in FIG. 4, the padlock 42 can be locked into place. This will secure the frame member 32 of the velocipede between elements 20 and portion 26b of member 26. It is apparent that the article to be carried will remain in this secure position until padlock 42 is removed by the keyholder so that pin 36 can be removed from apertures 38 and 40. Then and only then can member 26 be moved telescopically with respect to member 24 so as to permit removal of the article being carried from the carried elements 20.

DESCRIPTION OF A SECOND EMBODIMENT OF THE INVENTION

Turning now to FIGS. 5 through 8, another form of the article carrier of the present invention is there illustrated. This form of the invention comprises a lower connecting member 62 (FIG. 8) adapted to be removably interconnected with a tubular trailer hitch 14 of the character previously described. Interconnected with the connecting member 62 is a carrier assemblage, generally designated in FIG. 5 by the numeral 66, for carrying articles such as one or more pairs of skis 67.

In the embodiment of the invention shown in FIGS. 5 through 8, the carrier assemblage 66 comprises a generally vertically extending column 68 and a plurality of outwardly extending upper and lower article supporting second elements 70 and 71 respectively for removably supporting the skis 67. As best seen in FIG. 8, column 68 is interconnected with connecting member 62 by means of upper and lower threaded fasteners 72.

As in the earlier described embodiment, a securement means is carried by the carrier assemblage for cooperation with the article supporting elements 70 for preventing unauthorized removal of skis from the carrier assemblage. The securement means here comprises first and second slidably interconnected members 74 and 76 (FIG. 6). In the form of the invention shown in FIGS. 6 and 8, first member 74 of the securement means is connected to, and extends generally perpendicularly with respect to, vertically extending column 66. Member 74 can be connected to column 66 by any suitable means such as welding. Second member 76 is generally "T" shaped, having a horizontally extending member 76a which is telescopically receivable within tubular member 74 and a second horizontal member 76b which extends generally perpendicularly to member 76a. In a manner presently to be described, portion 76b of second member 76 is adapted to be moved into close proximity with the skis being carried to prevent unauthorized removal thereof from the article carrier.

Referring now to FIGS. 5 and 8 of the drawings, the carrier assemblage can be seen to further comprise a generally horizontally extending upper member 78 connected as by welding to column 66 proximate the upper end thereof and a generally horizontally extending lower member 79 connected as by welding to column 66 intermediate its ends. Horizontally extending members 78 and 79 function to carry the previously mentioned article supporting elements 70 and 71 in the manner illustrated in FIGS. 6 and 7. Each of the members 70 is provided with a hooklike portion 70a formed proximate the outer end thereof and each includes a threaded shank portion 70b formed proximate the other extremity thereof. Threaded shank portions 70b extend through apertures provided in horizontal member 78 and the elements are secured in place by means of a nut 80. As shown in FIG. 7, each of the members 71 is generally "U" shaped in configuration and each has threaded leg portions extending through apertures provided in horizontal member 79. As best seen in FIG. 7, members 71 are secured in place by nuts 81.

Forming another important feature of the alternate form of the invention shown in FIGS. 5 through 8 is a locking means for maintaining member 76b of the securement means in close proximity with article supporting elements 70 to prevent unauthorized removal of the skis from the carrier assemblage. In this embodiment of the invention, the locking means comprises an elongated locking pin 86 (FIG. 6) which is telescopically receivable within indexable apertures 88 and 90 formed in member 74 and second member 76a respectively of the securement means. Also forming a part of the locking means of this alternate form of the invention is a padlock 92 (FIG. 8) having a shackle 92a which is closely receivable within an aperture 94 formed proximate extremity 86a of locking pin 86. With this construction, when member 76a is telescopically positioned within member 74 so that member 76b is in close proximity with the skis, apertures 88 and 90 will move into index so as to permit the insertion of locking pin 86. With the locking pin fully inserted into apertures 88 and 90, padlock 92 can be secured in place as shown in FIG. 8, thereby preventing removal of pin 86 from apertures 88 and 90. This inability to remove pin 86 will, of course, prevent movement of member 76 relative to member 74 and, in turn, will preclude removal of the skis from the article carrier. Only after padlock 92 is unlocked by the keyholder and removed from pin 86 can the pin be removed from members 74 and 76a to permit member 76 be moved telescopically forwardly a sufficient distance so that the skis can be removed from between elements 70 and removed from the article carrier.

Turning now to FIG. 5, the second locking means of the present invention is there illustrated and is generally designated by the numeral 95. This second locking means is identical to the second locking means described in connection with the first embodiment and functions to prevent disconnection of the connecting member 62 from the trailer hitch assembly 14. The details of the construction and operation of this second locking means having earlier been described will not be here repeated.

OPERATION OF THE SECOND EMBODIMENT OF THE INVENTION

When the article carrier of the present invention is used to carry skis or similar articles, the form of the invention illustrated in FIGS. 5 through 8 is selected for use. In mounting this apparatus to the vehicle, padlock 54 is removed from pin 46 and the pin in removed from member 62 of the article carrier. Member 12 is then telescopically inserted into the trailer hitch and locked into place in the manner earlier described.

Once the article carrier is locked in place on the vehicle, padlock 92 is removed from pin 86 and pin 86 is removed from the upper assemblage of the carrier. Member 76 is then telescopically removed from member 74 and the skis are positioned as shown in FIG. 5 with the lower portions of the skis being inserted into elements 71 with the upper portions of the skis being disposed between elements 70. Elements 70 are provided with outturned ends to accommodate apertured straps (not shown) which may be used to hold skis securely together within the elements. However, such straps are not a requirement and form no part of the invention.

With the skis positioned, as shown in FIG. 5, member 76 is once again mated with the carrier assemblage by telescopically inserting portions 76a into member 74. Member 76b is urged inwardly toward the edges of the skis so as to index apertures 88 and 90 so that pin 86 can be reinserted. When the pin is fully inserted in the manner shown in FIG. 6, the padlock 92 can be locked into place. This will secure the skis between members 76b and 78. It is apparent that the skis cannot be removed outwardly due to member 76b or upwardly due to the bindings engaging elements 70 until padlock 88 is removed by the keyholder so that pin 86 can be removed.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An article carrier adapted to be detachably interconnected with a standard trailer hitch affixed to the frame of an automobile, comprising:
   (a) a connecting member adapted to be removably interconnected with the trailer hitch;
   (b) a carrier assemblage carried by said connecting member, comprising:
      (i) a generally vertically extending column; and
      (ii) at least one outwardly extending article supporting element carried by said column for supporting the article to be carried;
   (c) securement means carried by said carrier assemblage for cooperative interaction with said article supporting element for preventing removal of said article from said carrier assemblage, said securement means comprising a first tubular member connected to said column and a second member, said second member having a first portion telescopically receivable within said first member and a second portion comprising generally perpendicularly extending member adapted to be moved into close proximity with said article to prevent removal thereof from the article carrier; and
   (d) first locking means for preventing telescopic movement between said first portion of said second member and said first tubular member to maintain said securement means in cooperative interaction with said article supporting element to prevent removal of the article from the carrier assemblage, said first locking means including a padlock.

2. An article carrier as defined in claim 1 in which said carrier assemblage further comprises a generally horizontally extending member connected to said column, said article supporting element being connected to said generally horizontally extending member.

3. An article carrier as defined in claim 1 in which said first member of said securement means is provided with at least one aperture therethrough and in which said second member of said securement means is provided with an aperture therethrough adapted to be indexed with said aperture in said first member.

4. An article carrier as defined in claim 3 in which said locking means further comprises:
   (a) an elongated locking pin telescopically receivable within the apertures in said first and second members of said securement means so as to extend through said members said pin having a head at one end and being apertured proximate the other end; and
   (b) a lock having a shackle receivable within the apertured end of said elongated pin for preventing withdrawal of said pin from said apertures in said first and second members of said securement means.

5. An article carrier as defined in claim 4 in which said first member of said securement means is connected to and extends generally parallel with respect to said vertically extending column of said carrier assemblage.

6. An article carrier as defined in claim 5 in which said article carrier is adapted to carry a bicycle and in which said article supporting element is provided with a concave indenture adapted to support a frame member of the bicycle.

7. An article carrier as defined in claim 6 in which said second member of said securement means is adapted to be moved into pressural engagement with the frame member of the bicycle.

8. An article carrier as defined in claim 4 in which said first member of said securement means is connected to and extends generally perpendicularly to said vertically extending column of said carrier assemblage.

9. A bicycle carrier adapted to be detachably interconnected with a standard trailer hitch affixed to the frame of an automobile, comprising:
   (a) a connecting member adapted to be removably interconnected with the trailer hitch;
   (b) a carrier assemblage carried by said connecting member, comprising:
      (i) a generally vertically extending column;
      (ii) a generally horizontally extending member connected to said column; and
      (iii) a pair of outwardly extending bicycle supporting elements connected to said generally horizontally extending member for supporting a frame member of the bicycle;
   (c) securement means carried by said carrier assemblage for cooperative interaction with said bicycle supporting elements for preventing removal of said bicycle from said carrier assemblage, said securement means comprising:
      (i) a first tubular member connected to and extending generally parallel with respect to said vertically extending column of said carrier assemblage; and
      (ii) a second generally "L" shaped member having first and second perpendicularly extending portions, said first portion being telescopically receivable within said first tubular member, whereby said second portion can be moved into pressural engagement with the frame member of the bicycle;
   (d) first locking means, including a padlock, for preventing telescopic movement of said first portion of said second member and said first tubular member to maintain said second portion of said second member of said securement means in pressural engagement with said frame member of the bicycle; and
   (e) second locking means for preventing disconnection of said connecting member from the trailer hitch.

10. A carrier for carrying at least one pair of skis adapted to be detachably interconnected with a standard trailer hitch affixed to the frame of an automobile, comprising:
   (a) a connecting member adapted to be removably interconnected with the trailer hitch;
   (b) a carrier assemblage carried by said connecting member comprising:
      (i) a generally vertically extending column;
      (ii) first and second generally horizontally extending vertically spaced apart members connected to said column; and
      (iii) a plurality of outwardly extending ski supporting elements connected to said generally horizontally extending members for supporting the skis;
   (c) securement means carried by said carrier assemblage for cooperative interaction with at least one of said ski supporting elements for preventing removal of said skis from said carrier assemblage, said securement means comprising:
      (i) a first tubular member connected to and extending generally perpendicularly with respect to said vertically extending column of said carrier assemblage;
      (ii) a second generally "T" shaped member having first and second perpendicularly extending portions, said first portion being telescopically receivable within said first tubular member, whereby said second portion can be moved into close proximity with at least one of said ski support elements;
   (d) first locking means for maintaining said second portion of said second member of said securement means in close proximity with said at least one of said ski supporting elements; and
   (e) second locking means for preventing disconnecting member from the trailer hitch.

11. A bicycle carrier adapted to carry at least one pair of skis and adapted to be detachably interconnected with a standard trailer hitch affixed to the frame of an automobile, comprising:
   (a) a connecting member adapted to be removably interconnected with the trailer hitch;
   (b) a carrier assemblage carried by said connecting member, comprising:
      (i) a generally vertically extending column;
      (ii) at least one outwardly extending article supporting element carried by said column for supporting the article to be carried;
      (iii) a second generally horizontally extending member connected to said column and to said article supporting element; and
      (iv) at least one outwardly extending second supporting element connected to said second generally horizontally extending member for supporting the pair of skis;
   (c) securement means carried by said carrier assemblage for cooperative interaction with said article supporting element for preventing removal of said article from said carrier assemblage, said securement means comprising a first tubular member connected to and extending generally perpendicular to said column, said first tubular member having an aperture and a second generally "T" shaped member having a first leg telescopically receivable within said first member, said second member further including a generally perpendicularly extending leg adapted to be moved into close proximity with said article to prevent removal thereof from the article carrier, said second member having an aperture therethrough adapted to be indexed with said aperture in said first member; and
   (d) first locking means for maintaining said securement means in cooperative interaction with said article supporting element to prevent removal of the article from the carrier assemblage, said locking means comprising:
      (i) an elongated locking pin telescopically receivable within the apertures in said first and second members of said securement means so as to extend through said members said pin having a head at one end and being apertured proximate the other end; and (ii) a lock having a shackle receivable within the apertured end of said elongated pin for preventing withdrawal of said pin from said apertures in said first and second members of said securement means.

12. A bicycle carrier adapted to be detachably interconnected with a standard trailer hitch affixed to the frame of an automobile, comprising:

(a) a connecting member adapted to be removably interconnected with the trailer hitch;

(b) a carrier assemblage carried by said connecting member, comprising:
(i) a generally vertically extending column;
(ii) a generally horizontally extending member connected to said column; and
(iii) a pair of outwardly extending bicycle supporting elements connected to said generally horizontally extending member for supporting a frame member of the bicycle;

(c) a first apertured tubular member connected to and extending generally parallel with respect to said vertically extending column of said carrier assemblage; and (d) a second generally "L" shaped member having first and second perpendicularly extending portions, said first portion being apertured and telescopically receivable within said first tubular member, whereby said second portion can be moved into pressural engagement with the frame member of the bicycle;

(e) first locking means for preventing telescopic movement of said first portion of said second member and said first tubular member to maintain said second portion of said second member of said securement means in pressural engagement with said frame member of the bicycle, said first locking means comprising an elongated locking pin telescopically receivable within the apertures in said first and second members so as to extend through said members, said pin having a head at one end and being apertured proximate the other end, and a lock having a shackle receivable within the apertured end of said elongated pin for preventing withdrawal of said pin from said apertures in said first and second members of said securement means; and (f) second locking means for preventing disconnection of said connecting member from the trailer hitch.

13. A bicycle carrier as defined in claim 2 in which said locking means comprises a padlock.

* * * * *